US012633699B2

(12) United States Patent
Barry et al.

(10) Patent No.: US 12,633,699 B2
(45) Date of Patent: May 19, 2026

(54) DISTRIBUTION MODULE INCLUDING MOUNTING BRACKET FOR MOUNTING TO A MARINE VESSEL

(71) Applicant: SEAKEEPER, INC., California, MD (US)

(72) Inventors: Robert Barry, Port Murray, NJ (US); Nicholas J. Troche, Columbia, PA (US); Stephen Scott, Columbus, OH (US)

(73) Assignee: SEAKEEPER, INC., California, MD (US)

( * ) Notice: Subject to any disclaimer, the term of this patent is extended or adjusted under 35 U.S.C. 154(b) by 307 days.

(21) Appl. No.: 18/227,491

(22) Filed: Jul. 28, 2023

(65) Prior Publication Data

US 2024/0039207 A1 Feb. 1, 2024

Related U.S. Application Data

(60) Provisional application No. 63/393,743, filed on Jul. 29, 2022.

(51) Int. Cl.
*B63H 20/02* (2006.01)
*H01R 13/52* (2006.01)
(Continued)

(52) U.S. Cl.
CPC ........... *H01R 13/523* (2013.01); *B63H 20/02* (2013.01); *H01R 13/5202* (2013.01);
(Continued)

(58) Field of Classification Search
CPC .............. H01R 13/523; H01R 13/5202; H01R 13/5216; H01R 24/86; H01R 2201/00; B63H 20/02
See application file for complete search history.

(56) References Cited

U.S. PATENT DOCUMENTS

| | | |
|---|---|---|
| 4,524,942 A | 6/1985 | Kueny |
| 4,749,926 A | 6/1988 | Ontolchik |

(Continued)

FOREIGN PATENT DOCUMENTS

| | | |
|---|---|---|
| AU | 783746 B2 | 1/2003 |
| CA | 2795437 | 4/1928 |

(Continued)

OTHER PUBLICATIONS

US 11,198,496 B2, 12/2021, Wong et al. (withdrawn)

(Continued)

*Primary Examiner* — Thanh Tam T Le
(74) *Attorney, Agent, or Firm* — MARSHALL, GERSTEIN & BORUN LLP; Michael P. Furmanek

(57) ABSTRACT

The present disclosure is directed towards a distribution module assembly configured for mounting to a marine vessel and comprising a mounting bracket connected to a housing to aid in the stabilization of the marine vessel moving through water. The distribution module assembly further comprises a printed circuit board, a connector plate, and connectors which may connect to a variety of electronic components which also aid in the stabilization of the marine vessel. The printed circuit board is further configured to interface with various electronic components on the marine vessel such as a software control module, an engine control module, a navigation system, a gyroscopic stabilizer, a water engagement device, an engine, and other similar components that could provide the intended functionality and stability during operation of a marine vessel.

11 Claims, 11 Drawing Sheets

(51) Int. Cl.
*H01R 13/523* (2006.01)
*H01R 24/86* (2011.01)

(52) U.S. Cl.
CPC ......... *H01R 13/5216* (2013.01); *H01R 24/86* (2013.01); *H01R 2201/00* (2013.01)

(56) References Cited

U.S. PATENT DOCUMENTS 5,142,497 A 8/1992 Warrow
5,213,518 A * 5/1993 Weidler ............... H01R 25/162 439/211
5,263,432 A 11/1993 Davis
5,385,110 A 1/1995 Bennett et al.
D362,841 S 10/1995 Roza
5,474,012 A 12/1995 Yamada et al.
5,639,261 A * 6/1997 Rutkowski ......... G02B 6/44524 439/31
6,041,730 A 3/2000 Oliverio et al.
6,268,053 B1 7/2001 Woiszwillo et al.
6,273,771 B1 8/2001 Buckley et al.
6,354,237 B1 3/2002 Gaynor et al.
6,417,469 B1 7/2002 Tamura
6,537,106 B1 * 3/2003 Follingstad .............. H04Q 1/09 439/534
6,579,072 B2 6/2003 Trousil et al.
6,592,412 B1 7/2003 Geil et al.
6,608,764 B2 * 8/2003 Clark ................. H01R 13/6466 361/752
6,651,574 B1 11/2003 Ellens et al.
6,659,816 B2 12/2003 Fuse
6,766,962 B2 7/2004 Paul et al.
6,874,441 B2 4/2005 Pigeon
D507,543 S 7/2005 Ishii et al.
6,928,948 B1 8/2005 Shannon
7,025,026 B2 4/2006 Young et al.
7,040,937 B2 5/2006 Scott et al.
7,059,347 B2 6/2006 Schwartzman
7,112,090 B2 * 9/2006 Caveney .................. H04Q 1/09 439/540.1
7,128,014 B2 10/2006 Berthiaume et al.
7,128,626 B2 10/2006 Dundra et al.
7,128,627 B2 10/2006 Ferguson
7,137,347 B2 11/2006 Wong et al.
7,140,315 B2 11/2006 Okuyama
7,156,708 B2 1/2007 Dudra
7,171,982 B2 2/2007 Dudra
7,201,607 B2 * 4/2007 Bernhart .............. H01R 13/748 439/540.1
7,207,846 B2 * 4/2007 Caveney ................ H01R 29/00 439/676
7,258,072 B2 8/2007 Wong et al.
7,278,367 B1 10/2007 Gonring et al.
7,285,738 B2 10/2007 Lavigne et al.
7,311,058 B1 12/2007 Brooks et al.
7,318,386 B2 1/2008 Dudra et al.
D562,753 S 2/2008 Wall et al.
D562,754 S 2/2008 Wall et al.
7,364,482 B1 4/2008 Wong et al.
7,407,420 B1 8/2008 Fetchko et al.
7,455,548 B2 * 11/2008 Clark ....................... H04Q 1/09 439/534
7,479,607 B2 1/2009 Sack et al.
7,481,680 B2 * 1/2009 Caveney ................ H01R 29/00 439/676
7,497,183 B2 3/2009 Dudra et al.
7,553,199 B2 * 6/2009 Correll ................. H01R 9/2675 439/715
7,591,667 B2 * 9/2009 Gatnau Navarro .. H01R 13/641 361/736
7,597,552 B2 10/2009 Young et al.
7,601,040 B2 10/2009 Morvillo
7,631,610 B1 12/2009 Wolske
7,641,525 B2 1/2010 Morvillo
7,689,089 B2 * 3/2010 Wagner .................... H04Q 1/13 385/134
7,717,462 B2 5/2010 Liu et al.
7,722,418 B2 5/2010 Ellens et al.
7,743,721 B2 6/2010 Barrett et al.
7,806,142 B2 10/2010 Baros et al.
7,905,156 B2 3/2011 Scott et al.
7,958,837 B1 6/2011 Fraleigh
7,975,638 B1 7/2011 Harris et al.
8,007,330 B2 8/2011 Wong et al.
8,025,006 B2 9/2011 Baros
8,028,510 B2 10/2011 Scott et al.
8,042,480 B2 10/2011 Simons
8,062,010 B2 11/2011 Paramonoff et al.
D654,880 S 2/2012 Tam
8,113,892 B1 2/2012 Gable et al.
8,141,789 B2 3/2012 Schwartzman et al.
8,145,371 B2 3/2012 Rae et al.
8,151,723 B2 4/2012 Winiski et al.
8,170,734 B2 5/2012 Kaji
8,182,396 B2 5/2012 Martin et al.
8,241,055 B2 * 8/2012 Chen ................... H01R 13/743 439/540.1
8,261,682 B1 9/2012 DeVito
8,264,338 B2 9/2012 Leon
8,347,859 B2 1/2013 Garon et al.
8,382,515 B2 * 2/2013 Caveney .................. H04Q 1/09 439/540.1
8,387,589 B2 3/2013 Wong et al.
8,406,944 B2 3/2013 Garon et al.
8,425,270 B2 4/2013 Dudra et al.
8,430,702 B2 4/2013 Davidson et al.
8,435,088 B2 5/2013 Morettin et al.
8,457,820 B1 6/2013 Gonring
8,460,038 B2 * 6/2013 Eisert ................... H01R 9/2625 439/716
8,516,916 B2 8/2013 Scott et al.
8,550,023 B1 10/2013 Quail
8,578,838 B2 11/2013 Davidson
8,578,873 B2 11/2013 Gasper et al.
8,583,300 B2 11/2013 Oehlgrien et al.
8,610,013 B2 12/2013 Schmidt et al.
8,612,072 B2 12/2013 Garon et al.
D698,304 S 1/2014 Dubois et al.
D698,357 S 1/2014 Mainville et al.
8,626,962 B2 1/2014 Wong et al.
8,631,753 B2 1/2014 Morvillo
8,672,086 B2 3/2014 Wong et al.
8,683,300 B2 3/2014 Stek et al.
8,751,015 B2 6/2014 Frewin et al.
8,769,944 B2 7/2014 Redfern
8,834,199 B2 * 9/2014 Foung ...................... H04Q 1/13 439/540.1
8,845,490 B2 9/2014 Chan et al.
D720,305 S 12/2014 Wenji
8,901,443 B2 12/2014 Baker et al.
8,930,050 B2 1/2015 Garon et al.
8,931,707 B2 1/2015 Wilnechenko et al.
8,957,338 B2 2/2015 Li
D725,050 S 3/2015 Tsugawa et al.
D725,612 S 3/2015 Schlegel et al.
8,992,273 B2 3/2015 Winiski et al.
D727,190 S 4/2015 Higgs
8,997,628 B2 4/2015 Sall et al.
9,032,898 B2 5/2015 Widmark
9,068,855 B1 6/2015 Guglielmo
9,078,051 B2 * 7/2015 Ruiz ....................... H04Q 1/13
9,104,227 B2 8/2015 Clarke et al.
9,233,740 B2 1/2016 Morvillo
9,260,161 B2 2/2016 Gasper et al.
9,278,740 B1 3/2016 Andrasko et al.
9,334,022 B2 5/2016 Gasper et al.
9,340,257 B2 5/2016 Ulgen
D758,325 S 6/2016 Cook et al.
D758,975 S 6/2016 Hunter et al.
9,377,780 B1 6/2016 Arbuckle et al.
9,423,894 B2 8/2016 Olsson et al.
9,459,787 B2 10/2016 Kulczycki et al.
9,522,723 B1 12/2016 Andrasko et al.

(56) References Cited

U.S. PATENT DOCUMENTS 9,559,649 B2 1/2017 Noh et al.
D782,987 S 4/2017 Gassner
9,631,753 B2 4/2017 Wood et al.
9,689,395 B2 6/2017 Hartman
9,710,077 B2 7/2017 Okazaki
9,745,020 B2 8/2017 Snow
9,832,542 B2 * 11/2017 Carreras Garcia ...... H04Q 1/13
9,834,293 B2 12/2017 Wood et al.
D807,309 S 1/2018 Johnson et al.
9,857,794 B1 1/2018 Jarrell et al.
9,896,173 B2 2/2018 Baros et al.
9,911,556 B2 3/2018 Lee et al.
9,944,377 B2 4/2018 Davidson et al.
9,950,771 B1 4/2018 Hartman et al.
D818,973 S 5/2018 Tang et al.
9,978,540 B2 5/2018 Tanaka et al.
9,988,126 B2 6/2018 Wood
9,994,291 B2 6/2018 Scott
10,000,268 B1 6/2018 Poirier et al.
10,040,522 B1 8/2018 Hartman et al.
10,112,692 B1 10/2018 Anschuetz
10,202,179 B2 2/2019 Wong et al.
10,281,928 B2 5/2019 Behling et al.
10,358,189 B2 7/2019 Sheedy et al.
10,370,070 B2 8/2019 Fetchko et al.
10,386,834 B2 8/2019 Green et al.
D858,465 S 9/2019 Desbiens
10,418,764 B2 * 9/2019 Baines ................. H01R 13/665
10,431,099 B2 10/2019 Stewart et al.
10,457,371 B2 10/2019 Hara et al.
D884,856 S 5/2020 Jones et al.
10,647,399 B2 5/2020 Davidson et al.
10,671,073 B2 6/2020 Arbuckle et al.
10,683,073 B2 6/2020 Redfern et al.
10,683,074 B2 6/2020 Davidson et al.
10,696,368 B2 6/2020 Mizutani et al.
10,696,369 B2 6/2020 Takase et al.
10,766,590 B2 9/2020 Nanjo et al.
10,781,947 B2 9/2020 Fetchko et al.
10,829,190 B1 11/2020 Pugh et al.
10,829,191 B2 11/2020 Wong et al.
10,889,358 B2 1/2021 Wong et al.
10,906,623 B2 2/2021 Chan et al.
10,940,927 B2 3/2021 Chan et al.
11,000,268 B2 5/2021 Poucher et al.
11,040,757 B2 6/2021 Huyge et al.
11,155,322 B2 10/2021 Baros
11,228,818 B2 * 1/2022 Shih ..................... H01R 13/743
11,319,916 B2 5/2022 Strang et al.
11,356,751 B2 * 6/2022 White ...................... H04Q 1/13
11,372,411 B1 6/2022 Derginer et al.
11,395,436 B2 * 7/2022 Liu .......................... H04Q 1/13
11,433,981 B2 9/2022 Chan et al.
11,465,726 B2 10/2022 Nakatani
11,467,583 B2 10/2022 Mizutani
11,530,022 B1 12/2022 Andrasko et al.
11,679,853 B2 6/2023 Wong et al.
11,777,236 B2 * 10/2023 Bisht .................... H01R 9/2608 439/716
12,272,898 B2 * 4/2025 Keith ................... H01R 13/518
2003/0082964 A1 5/2003 Simner
2005/0233655 A1 10/2005 Maselter
2007/0006101 A1 1/2007 Michaels
2007/0238370 A1 10/2007 Morvillo
2007/0276563 A1 11/2007 Kaji
2009/0076671 A1 3/2009 Mizutani
2009/0165694 A1 7/2009 Beamer
2010/0094491 A1 4/2010 Oehlgrien et al.
2010/0102173 A1 4/2010 Everett et al.
2010/0198435 A1 8/2010 Cansiani et al.
2011/0000268 A1 1/2011 Schaafsma et al.
2011/0120364 A1 5/2011 Mueller
2011/0143608 A1 6/2011 Chiecchi
2011/0151732 A1 6/2011 Chiecchi
2011/0320072 A1 12/2011 Morvillo
2012/0103774 A1 5/2012 Jun
2012/0247934 A1 10/2012 Schmidt et al.
2013/0213293 A1 8/2013 Gasper et al.
2014/0043303 A1 2/2014 Baker et al.
2014/0183011 A1 7/2014 Park et al.
2014/0224166 A1 8/2014 Morvillo
2014/0348207 A1 11/2014 Wilnechenko et al.
2014/0365050 A1 12/2014 Morvillo
2016/0097393 A1 4/2016 Hartman
2017/0250037 A1 8/2017 Tanaka et al.
2017/0313386 A1 11/2017 Snow
2017/0349257 A1 12/2017 Hara et al.
2018/0201342 A1 7/2018 Huyge et al.
2020/0303235 A1 9/2020 Miyadate et al.
2020/0354030 A1 11/2020 Bowie
2021/0086875 A1 3/2021 Nakatani
2021/0107617 A1 4/2021 Nakatani
2021/0339834 A1 11/2021 Bartlett
2022/0004125 A1 1/2022 Mitsumata et al.
2022/0075363 A1 3/2022 Green et al.
2022/0334596 A1 10/2022 Chan et al.
2022/0355913 A1 11/2022 Davidson et al.
2023/0073225 A1 3/2023 Chan et al.
2023/0166823 A1 6/2023 Wood et al.
2023/0257096 A1 8/2023 Wong et al.
2023/0303235 A1 9/2023 Wong et al.

FOREIGN PATENT DOCUMENTS

CA 304073 A 9/1930
CA 2236483 C 5/1998
CA 2372402 C 2/2002
CA 3048271 A1 6/2019
CA 3048276 A1 6/2019
CA 3048282 A1 12/2020
CN 109110073 A 1/2019
CN 112124548 A 12/2020
DE 19837888 C1 8/1998
EP 0928739 A2 7/1999
JP H0350087 A 3/1991
JP H0382697 A 4/1991
JP H03114996 A 5/1991
JP H06255577 A 9/1994
JP H09286390 A 11/1997
JP H09315384 A 12/1997
JP 2001294197 A 10/2001
JP 2002-284087 A 10/2002
JP 2003341589 A 12/2003
JP 2004224103 A 8/2004
JP 2005-280550 A 10/2005
JP 2005324716 A 11/2005
JP 2009037287 A 4/2009
JP 2012-035786 A 2/2012
JP 2013035351 A 2/2013
JP 2013100102 A 5/2013
JP 2014196091 A 10/2014
JP 2018030573 A 3/2018
KR 10-2011-0078767 A 7/2011
KR 10-2011-0139800 A 12/2011
KR 10-2012-0019280 A 3/2012
KR 10-1259134 B1 4/2013
KR 10-1297596 B1 8/2013
KR 10-2013-0119071 A 10/2013
KR 10-1491661 B1 2/2015
KR 10-2017-0143039 A 12/2017
KR 10-2275079 B1 7/2021
WO 2003068590 A2 8/2003
WO 2006058232 A1 6/2006
WO 2008100903 A2 8/2008
WO 2009134153 A1 5/2009
WO 2010003905 A1 1/2010
WO 2011099931 A1 8/2011
WO 2011142870 A2 11/2011
WO 2016036616 A1 3/2016

(56) References Cited

FOREIGN PATENT DOCUMENTS

| | | | |
|---|---|---|---|
| WO | 2016209401 | A1 | 12/2016 |
| WO | 2023092228 | A1 | 1/2023 |

OTHER PUBLICATIONS

Auto TrimPro Electric Owner Install Guide; 48 pgs.

Trygve Lauvdal and Thor I. Fossen; Norwegian University of Science and Technology, Department of Engineering Cybernetics, n-7034 Trondheim, Norway; Nonlinear Non-Minimum Phase Rudder-Roll Damping System for Ships Using Sliding Mode Control; 6 pgs.

Asgei J. Sorenson; Department of Marine Technology, Norwegian University of Science and Technology ; 2013 Department of Marine Technology, NTNU; Marine Control Systems, Propolsion and Motion Control of Ships and Ocean Sructures Lecture Notes; 536 pgs.

European Patent Office Extended European Search Report mailed Aug. 26, 2022 from corresponding European Patent Application No. 19869718.7; 7 pages.

WIPO, Canadian International Searching Authority, International Search Report mailed Dec. 13, 2019 in corresponding International Patent Application No. PCT/CA2019/051410, 3 pages.

WIPO, Canadian International Searching Authority, Written Opinion mailed Dec. 4, 2019 in corresponding International Patent Application No. PCT/CA2019/051410, 6 pages.

LENCO—We Make The Best Boats Better!; The World Leader In Trim Tab Systems & Hatch Lift Innovation Owner's Manual; May 21, 2019; 28 pgs.

Volvo Penta; Boat Trim System; Mar. 2017; 4 pgs.

Australian Boat Magazine; The Intriguing Zipwake Trim; May 2015; 6 pgs.

Interceptors/Trim Tabs/Force Producers for Ship Motion Control—Maritime Dynamics, Inc.

International Search Report and Written Opinion, filed in PCT/US2022/038962 dated Nov. 16, 2022; 7 pgs.

International Search Report and Written Opinion, filed in PCT/US2022/038102 dated Nov. 15, 2022; 9 pgs.

International Search Report and Written Opinion, filed in PCT/US2022/038964 dated Nov. 28, 2022; 8 pgs.

International Search Report and Written Opinion, filed in PCT/US2022/040944 dated Dec. 2, 2022; 7 pgs.

International Search Report and Written Opinion issued in PCT/US2023/028991 dated Nov. 13, 2023; 9 pages.

* cited by examiner

DISTRIBUTION MODULE INCLUDING MOUNTING BRACKET FOR MOUNTING TO A MARINE VESSEL

CROSS REFERENCE TO OTHER APPLICATION

This application claims the benefit of and priority to U.S. Provisional Application No. 63/393,743 filed Jul. 29, 2022, the contents of which are incorporated by reference.

BACKGROUND

The present disclosure is directed to an apparatus useful in a system configured to stabilize a watercraft while it is traveling on the water. In particular, the present disclosure is directed to a module of the system, including the mounting assembly therefor, and the method of installation thereof. More particularly, the present disclosure is further directed towards a distribution module with a housing, a mounting bracket, a connector plate, a sealing gasket, connecting hardware, and mounting hardware.

A watercraft moving through the water is free to rotate in three directions corresponding to its three principal axes. The front of the watercraft, or bow, may rotate along its vertical axis by turning left or right-known as yaw. The bow may rotate along the watercraft's transverse axis by moving up or down-known as pitch. The watercraft may rotate along the watercraft's longitudinal axis, by tilting to the left or right-known as roll. Unintentional rotation along these axes is caused by water currents, waves, and wind. Unchecked, a watercraft's yaw, roll, or pitch can lead to inefficient travel, damage to the watercraft or its cargo, and can be dangerous to individuals aboard the watercraft.

To lessen unintentional yaw, pitch, or roll while moving, watercraft have traditionally used various methods and apparatuses to make water travel smoother and safer. For example, ballast devices have been used for centuries to increase stability to lessen unintentional rotation. Ballast is by design heavy, often bulky, and generally positioned at the lower point of the vessel, generally below the water line. Additionally, deep rudders or keels have long been used to stabilize a watercraft from unintentional roll or pitch. Rudders or keels extend below the hull of a watercraft into the water and create resistance to unintentional rotation caused by current, waves, or wind. Many modern watercraft use water engagement devices, such as, trim tabs, wake gates, interceptors, fins and other similar devices, in a system powered by the on-board electrical system and controlled by an on-board computer system.

These conventional methods and system to reduce unintentional rotation have disadvantages. Traditional ballast is heavy and occupies the limited space on the watercraft. Not all watercraft may be equipped with a deep keel or rudder—either due to speed constraints or water depth constraints. And motor fins are limited in size and are generally affixed directly to the motor, limiting their range of motion. Finally, all traditional means of reducing unintentional rotation while traveling are static or at least very slow to respond to changing conditions. Currents, waves, and wind are not static. Conditions on the water, especially on the ocean, can change quickly and unpredictably. Further, each of the forces—currents, waves, and wind—act on a watercraft simultaneously, to different degrees, and with non-corresponding magnitudes or directions, making traditional methods of watercraft stabilization ill-equipped to accurately and nimbly respond to changing water conditions. Moreover, on-board power and computer systems are influenced, disrupted or interfered with by the vibrations in the marine vessel as a result of the engines, waves and other inputs.

Thus, there exists a long-felt, unmet need for a means of watercraft stabilization which is not bulky, is compatible with all watercrafts, easily installed and removed, and which can isolate the sensitive electronics from disruptive vibrations.

SUMMARY

An embodiment of the present disclosure may be mounted adjacent the transom of a watercraft by a mounting bracket and corresponding mounting hardware.

An embodiment of the present disclosure may be in communication with other watercraft stabilization components.

An embodiment of the present disclosure may be used in fresh water environments.

An embodiment of the present disclosure may be used in salt water environments.

A distribution module assembly configured for mounting to a marine vessel comprises a mounting bracket including a mounting base plate disposed between a first end portion and a second end portion, wherein the first and second end portions are parallel to the mounting base plate and disposed offset in a direction from the mounting base plate. Each of the first and second end portions includes a standoff, and wherein the mounting bracket is configured to be connected to a surface of the marine vessel. A housing including a centrally disposed compartment defined by a plurality of perimeter compartment walls with an open top, a pair of pockets each defined by a plurality of pocket walls extending from oppositely disposed compartment walls, and a volume defined by the perimeter compartment wall that extends between the pair of pockets, a rear edge of the housing and the surface of the marine vessel. The housing is connected to the mounting bracket such that the first and second end portions are each disposed in one of the pair of pockets and the mounting base plate is disposed in the volume.

In an aspect of the present disclosure, a method of installing a distribution module to a transom of a marine vessel comprises the steps of: (1) connecting a mounting bracket on a surface of a marine vessel, wherein the mounting bracket includes a mounting base plate disposed between a first end portion and a second end portion, wherein the first and second end portions are parallel to the mounting base plate and disposed offset in a direction from the mounting base plate, wherein each of the first and second end portions includes a standoff; and (2) connecting a housing to the mounting bracket, wherein the housing includes a compartment defined by a plurality of perimeter compartment walls with an open top and a pair of pockets each defined by a plurality of pocket walls extending from oppositely disposed compartment walls, and a volume defined by the perimeter compartment wall that extends between the pair of pockets, a rear edge of the housing and the surface of the marine vessel wherein the first and second end portions are each disposed in one of the pair of pockets and the mounting base plate is disposed in the volume.

Accordingly, it is an object of the disclosure to not encompass within the disclosure any previously known product, process of making the product, method of using the product, or method of treatment such that Applicants reserve the right and hereby disclose a disclaimer of any previously known product, process, or method. It is further noted that the disclosure does not intend to encompass within the scope of the disclosure any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the disclosure.

These and other embodiments are disclosed or are obvious from and encompassed by the following Detailed Description.

BRIEF DESCRIPTION OF THE DRAWINGS

The following brief description of the drawings, given by way of example, but not intended to limit the disclosure solely to the specific embodiments described, may best be understood in conjunction with the accompanying drawings.

DETAILED DESCRIPTION

Figure 1:
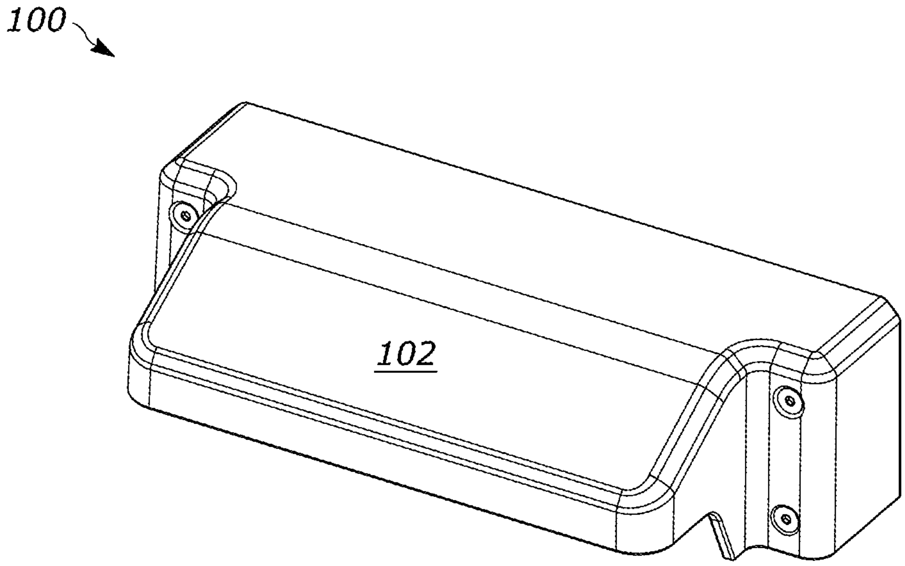
FIG. 1 is a front perspective view of an embodiment of a distribution module in accordance with the present disclosure.
Figure 2:
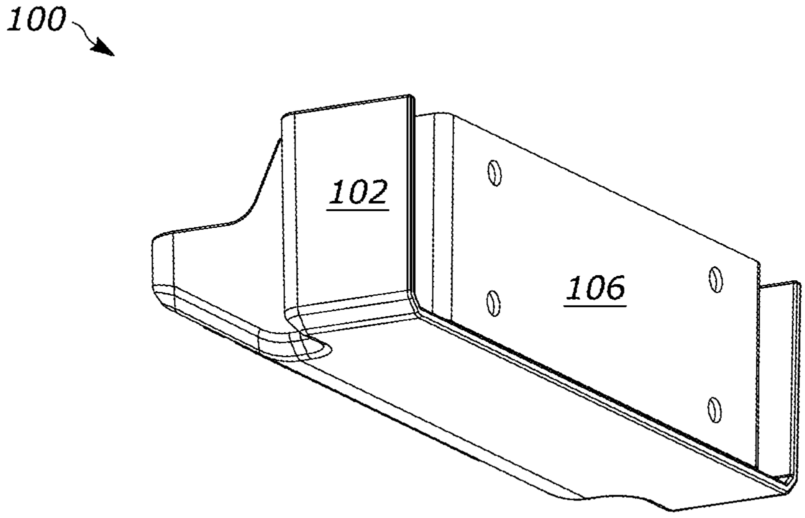
FIG. 2 is a rear perspective view of the distribution module of FIG. 1.
Figure 3:
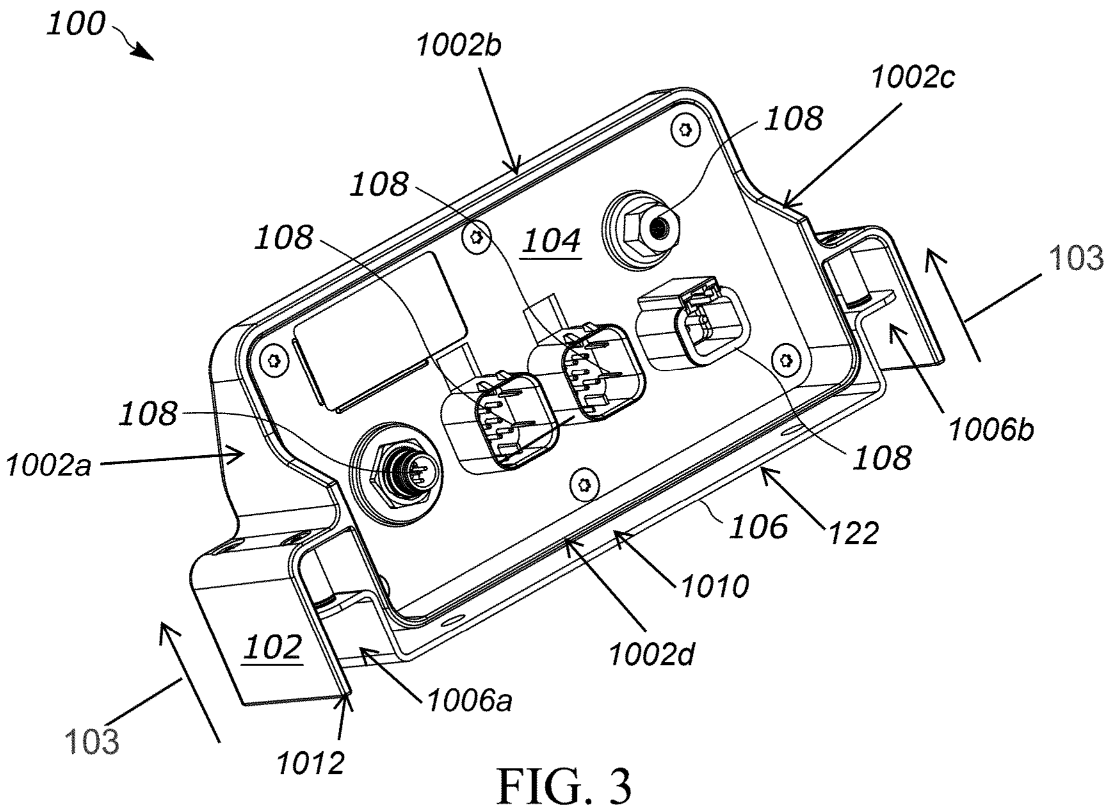
FIG. 3 is a bottom perspective view of the distribution module of FIG. 1.
Figure 4A:
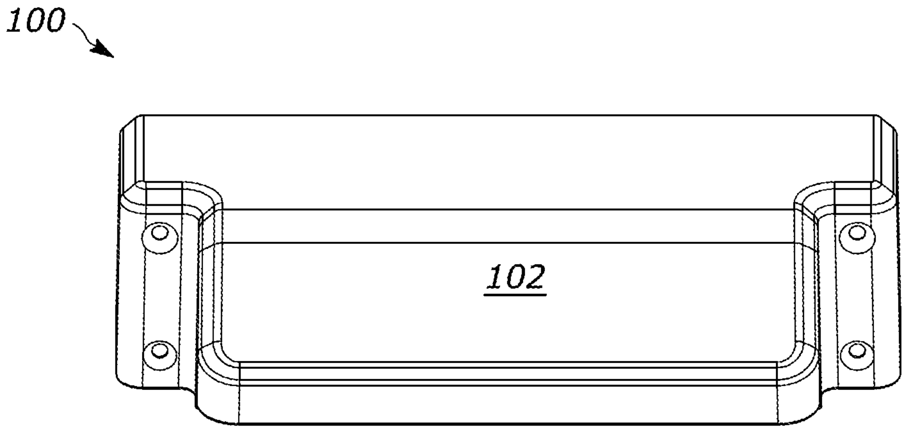
FIG. 4*a* is a front perspective view of an embodiment of a housing of the distribution module of FIG. 1 in accordance with the present disclosure.
Figure 4B:
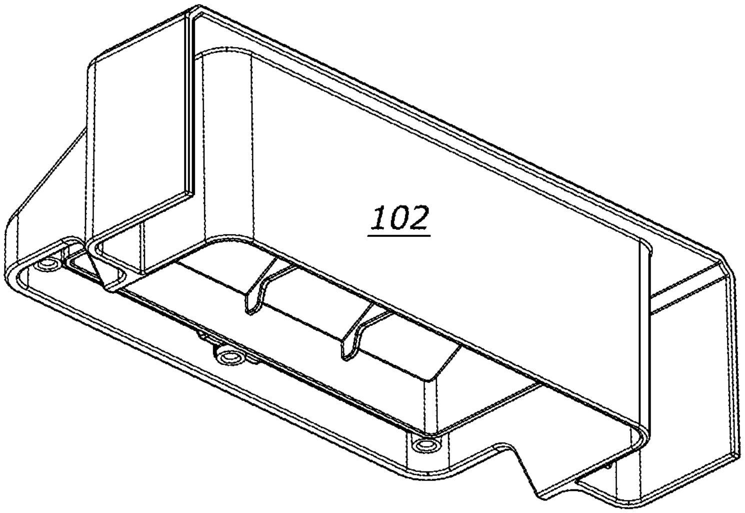
FIG. 4*b* is a first bottom perspective view of the housing of FIG. 4*a*.
Figure 4C:
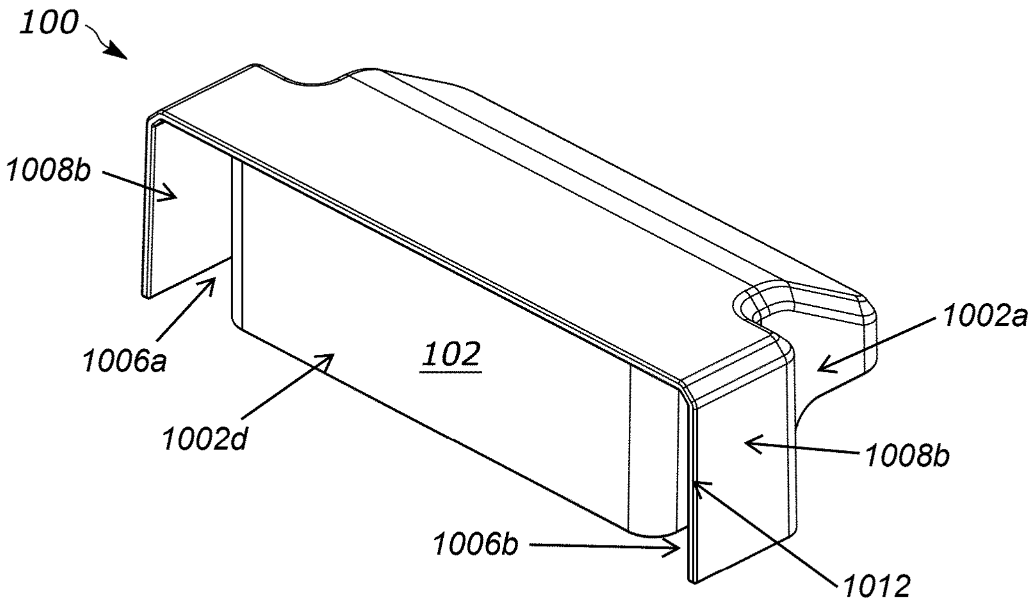
FIG. 4*c* is a rear perspective view of the housing of FIG. 4*a*.
Figure 4D:
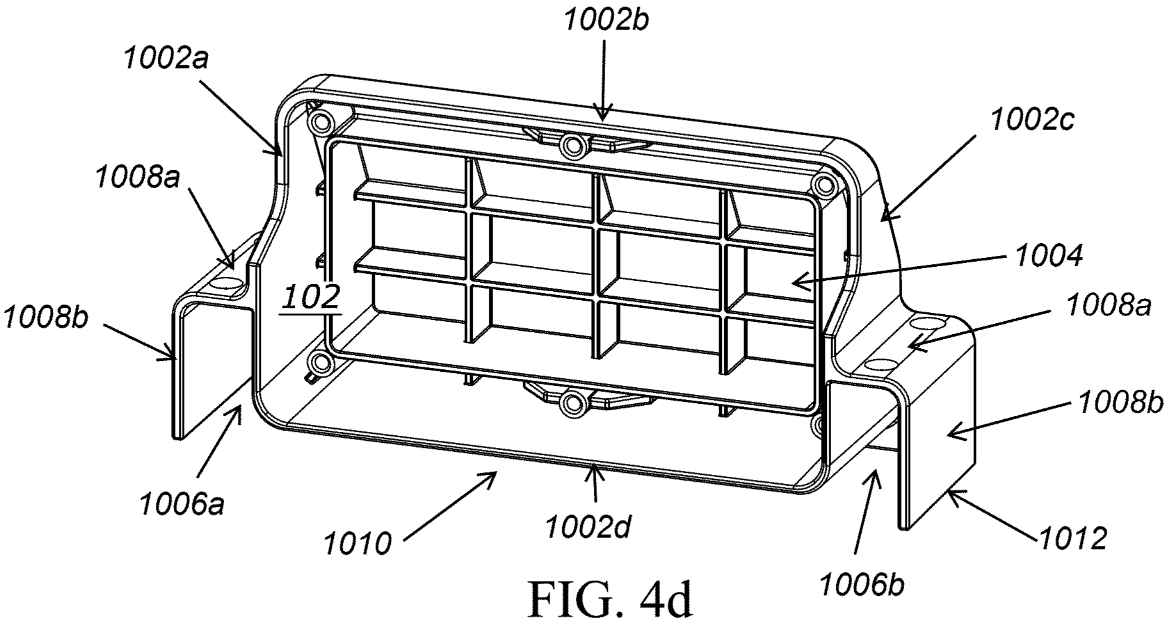
FIG. 4*d* is a second bottom perspective view of the housing of FIG. 4*a*.

FIGS. 1-5 generally illustrate the exterior of a distribution module 100 according to one aspect of the present application. The external portion of the distribution module generally 100 comprises a housing 102, a connector plate 104, a mounting bracket 106, and hardware connectors 108. FIG. 1 depicts a front perspective view of an embodiment of a distribution module in accordance with the present disclosure. FIG. 2 depicts a rear perspective view of the distribution module of FIG. 1. FIG. 3 depicts a bottom perspective view of the distribution module of FIG. 1 wherein the connector plate 104 and connectors 108 are shown.

Figure 11:
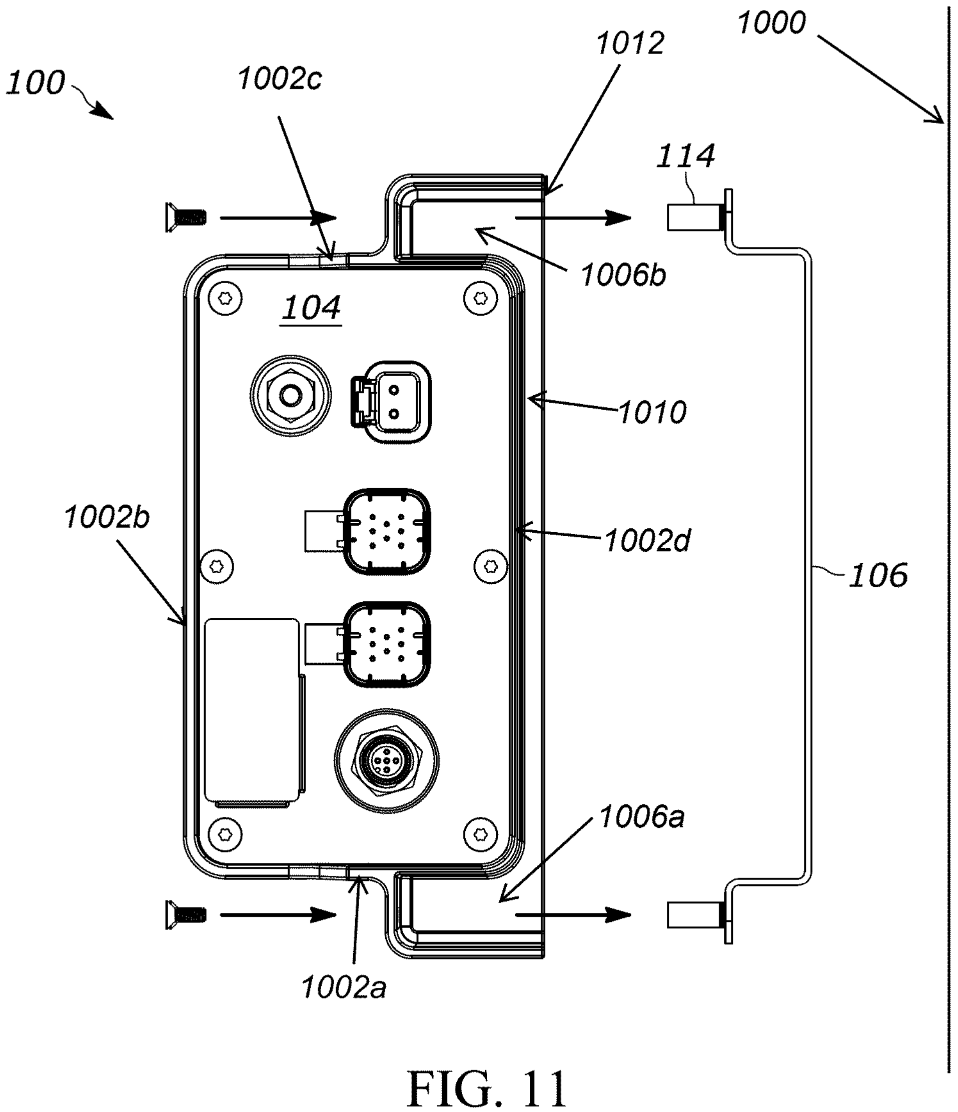
FIG. 11 is a bottom exploded view of the distribution module of FIG. 1.

The distribution module 100 is preferably configured to be installed onto a surface of a marine vessel such as a transom 1000 of a watercraft, as depicted in exploded view in FIG. 11, for example. This is beneficial because the distribution module 100 is compatible with most transoms and does not need to be specially fitted to a watercraft in order to be used. Further, since the transom 1000 is commonly subject to considerable vibrations from the engines the operational sensors and software may be located remotely from the transom 1000. The distribution module 100 cannot be easily opened. This ensures the internal components are not damaged by water or other contaminants. Preferably, as a step in the manufacturing process, the interior of the distribution model 100 may be potted with a solid or gelatinous compound.

The distribution module 100 is equipped with several connectors 108 which may receive electronic cables from other components in the system. A user can install or remove the distribution module 100 while it is connected to various other components without having to disconnect any electronic cables connected to a connector 108. This is possible due to the shape of the mounting bracket 106 and stand-offs 114 which extend from the mounting bracket 106.

Figure 10:
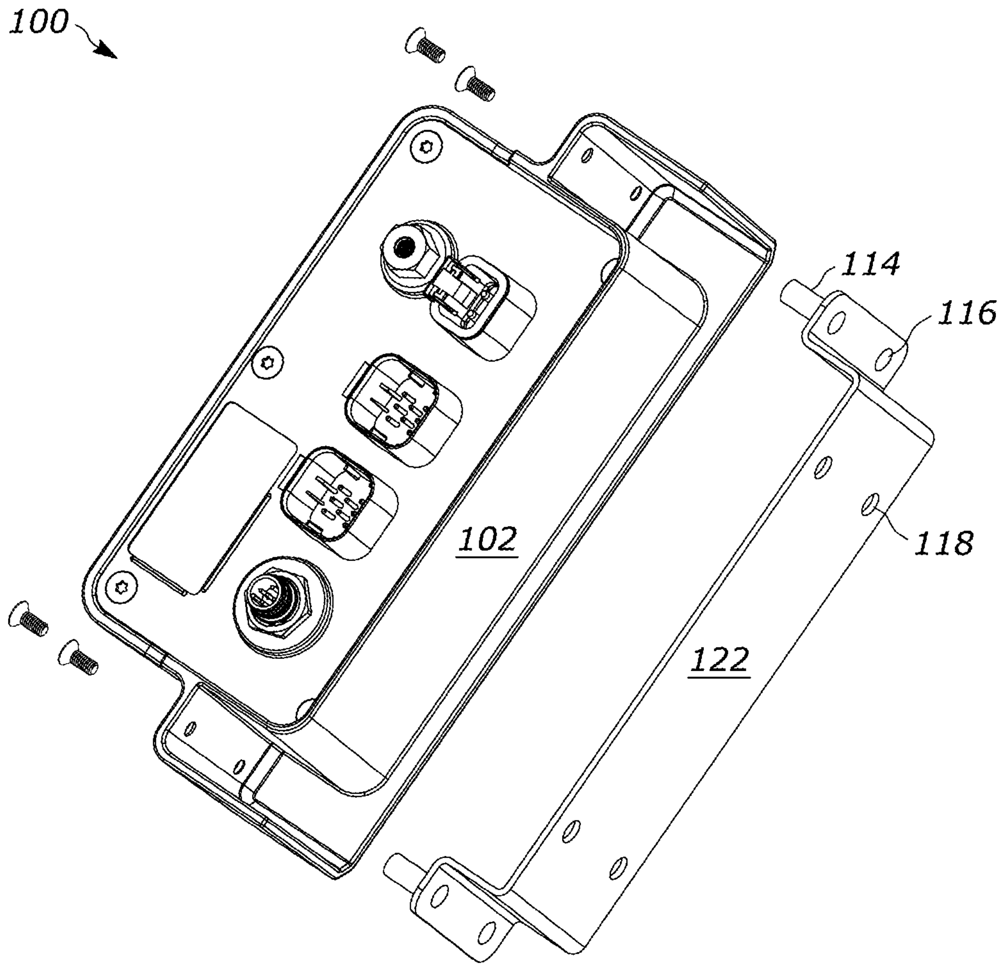
FIG. 10 is a perspective exploded view of the distribution module of FIG. 1.

The mounting bracket 106 facilitates easy mounting to the transom 1000 of a watercraft. FIGS. 10 and 11 depict the mounting bracket 106 separate from the distribution module 100. The mounting bracket 106 may be affixed to a watercraft transom 1000 by means of four mounting holes 118. Screws or any other affixing means may be used to affix the mounting bracket 106 to a transom 1000. The mounting bracket 106 may also include a stand-off 114 connected to each opening 116 by a threaded fastener or a similar apparatus to provide the same functionality. The shape of the mounting bracket 106 further facilitates the installation of the mounting bracket onto a transom 1000. The mounting bracket comprises a mounting base plate (or mounting face) 122 disposed between a first end portion and a second end portion, wherein the first and second end portions are parallel to the mounting base plate and disposed offset in a direction (shown as arrow 103 in FIGS. 3 and 5 a) from the mounting base plate 122.

As illustrated in FIG. 11, for example, the mounting base plate/face 122 of mounting bracket 106 lays flush against a transom 1000 and contains two wing flanges 120 (identified in FIGS. 5*a* and 5*b*) which extend away from the mounting face 122 of the mounting bracket 106. The wing flanges 120 allow a user to secure the distribution housing 102 to the mounting bracket 106 by means of a screw or other securing mechanism onto the stand-offs 114 after the stand-offs 114 have been aligned with the openings on the front of the distribution housing 102. The distribution housing 102 may include a pair of opposed pockets 1006*a*, 1006*b* (shown, for example in FIG. 11) each configured to receive and cover the first end and second end portions of the mounting bracket 106, including the stand-offs 114.

The location of the mounting bracket 106 in relation to the remaining external components of the distribution module is beneficial as the distribution module 100 may be affixed or removed from the mounting bracket 106 without disconnecting any electronic or power cables connected to the connectors 108 on the adjacent side of the distribution module.

FIGS. 4*a*, 4*b*, 4*c*, and 4*d* depict various views of the housing 102. The housing 102 includes a centrally disposed compartment defined by a plurality of perimeter compartment walls 1002*a*, 1002*b*, 1002*c*, 1002*d* with an open top 1004, a pair of pockets 1006*a*, 1006*b* each defined by a plurality of pocket walls 1008*a*, 1008*b* extending from oppositely disposed compartment walls 1002*a*, 1002*c*, and a volume 1010 defined by the perimeter compartment walls 1002*a*, 1002*b*, 1002*c*, 1002*d* that extends between the pair of pockets 1006*a*, 1006*b*, a rear edge 1012 of the housing and the transom 1000 (shown in FIG. 11), e.g., surface of the marine vessel. The housing 102 is connected to the mounting bracket 106 (as seen in FIG. 3) such that the first and second end portions of the mounting bracket 106 are each disposed in one of the pair of pockets 1006*a*, 1006*b* and the mounting base plate 122 is disposed in the volume 1010 of the housing. The housing 102 is a custom shape designed to protect the hardware and printed circuit board (not depicted in FIG. 4) inside the distribution module 100. The housing 102 is not readily removable from the remainder of the distribution module 100 to ensure the internal components remain secure. The housing 102 shape can accommodate a mounting bracket 106 (shown in FIG. 11) to facilitate connecting the distribution module directly on to the transom of a watercraft.

Figure 5A:
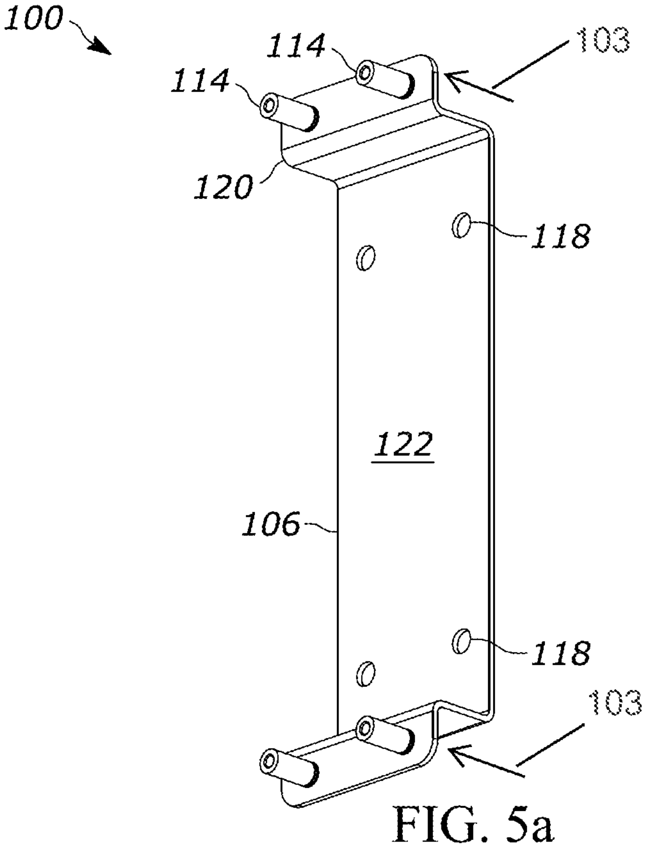
FIG. 5*a* is a front perspective view of an embodiment of a mounting bracket of the distribution module of FIG. 1 in accordance with the present disclosure.
Figure 5B:
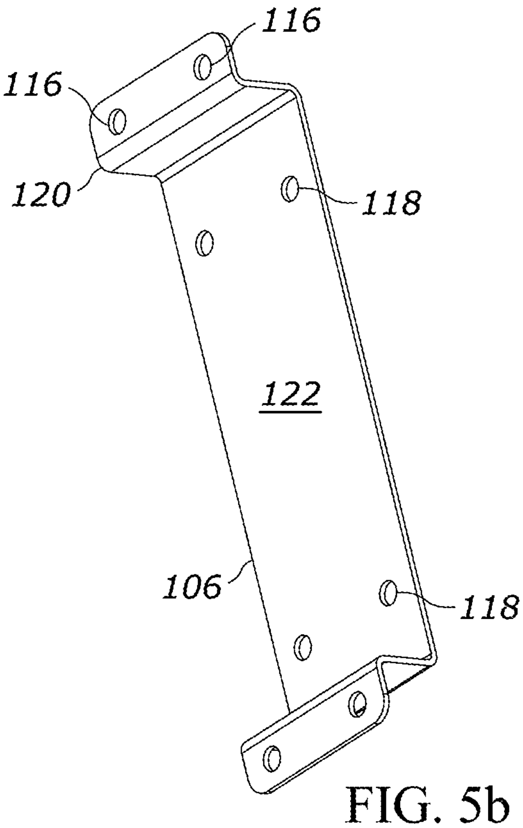
FIG. 5*b* is a front perspective view of another embodiment of a mounting bracket of the distribution module of FIG. 1 in accordance with the present disclosure.

FIGS. 5*a* and 5*b* generally depict two views of the mounting bracket 106. The mounting bracket 106 contains a mounting base plate 122, a pair of wing flanges 120, mounting holes 118, and stand-off mounting holes 116. The mounting base plate 122 may lay flat against a transom when fully installed and is secured by means of the mounting hole 118. The distribution module 100 is connected to the bracket 106 by aligning the openings on the front of the distribution module 100 with the stand-offs 114 (shown in FIG. 5*a*) and securing the module 100 with a set of screws.

Figure 6A:
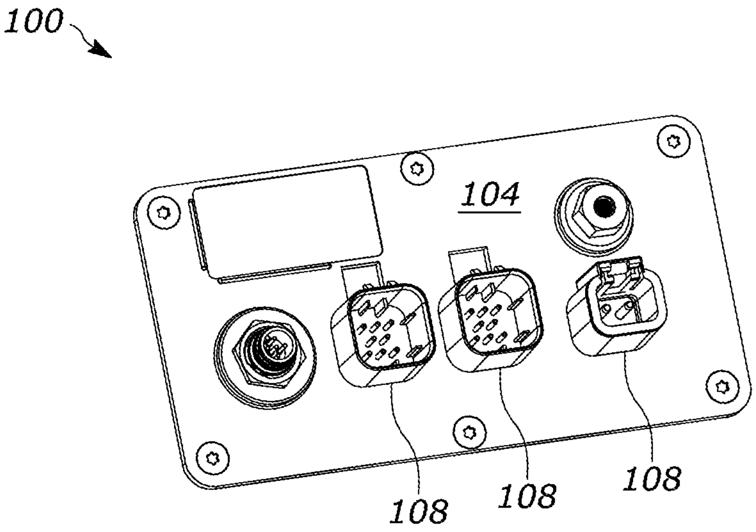
FIG. 6*a* is a front perspective view of an embodiment of a connector plate of the distribution module of FIG. 1 in accordance with the present disclosure.
Figure 6B:
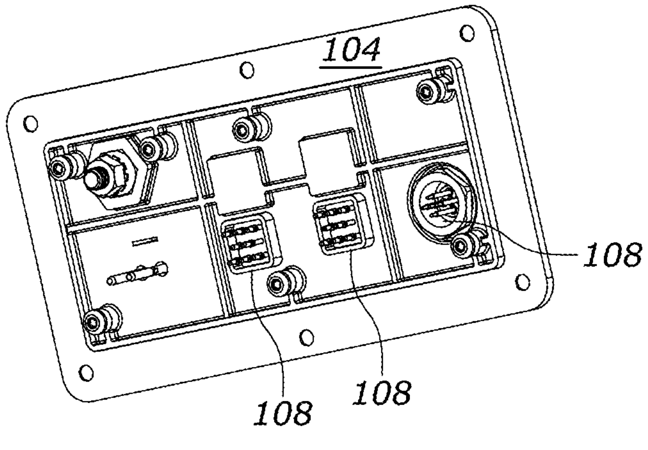
FIG. 6*b* is a rear perspective view of the connector plate of FIG. 6*a*.

FIGS. 6*a* and 6*b* generally depict two views of the connector plate 104. The connector plate facilitates the electronic connections to other system components not described herein. For example, the connector plate may be in communication with a system monitor, a central computer system, stabilizing actuators, the motor, or other electronic features necessary to propel and stabilize a watercraft. The connector plate 104 depicted in FIGS. 6*a* and 6*b* contains connectors 108 for coupling or interfacing with stabilizing components on the watercraft. FIG. 6*a* depicts the external-facing side of the connector plate 104. FIG. 6*b* depicts the internal-facing side of the connection plate 104.

Figure 8A:
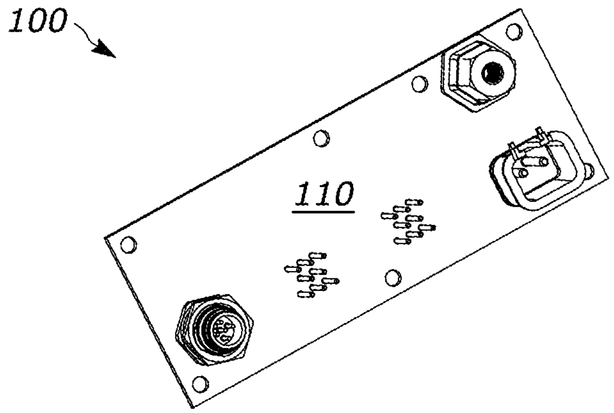
FIG. 8*a* is a front perspective view of an embodiment of a printed circuit board of the connector plate of FIG. 6*a* in accordance with the present disclosure.
Figure 8B:
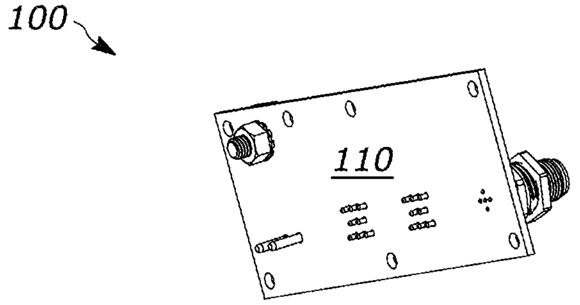
FIG. 8*b* is a rear perspective view of the printed circuit board of FIG. 8*a*.
Figure 9:
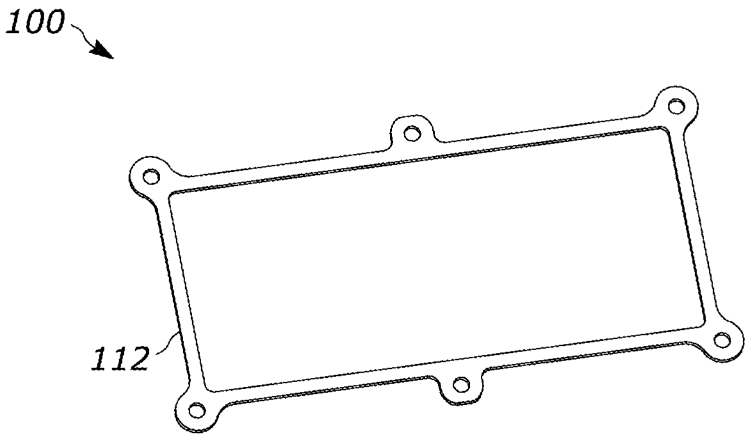
FIG. 9 is a front perspective view of an embodiment of a gasket in accordance with the present disclosure.

FIGS. 7-9 generally relate to internal components of the present disclosure. In general, the internal components of the distribution module 100 comprise: a gasket 112, a printed circuit board 110, and connecting hardware 108. The connectors 108 generally are coupled to the printed circuit board 110 to facilitate communicative connection therebetween.

Figure 7A:
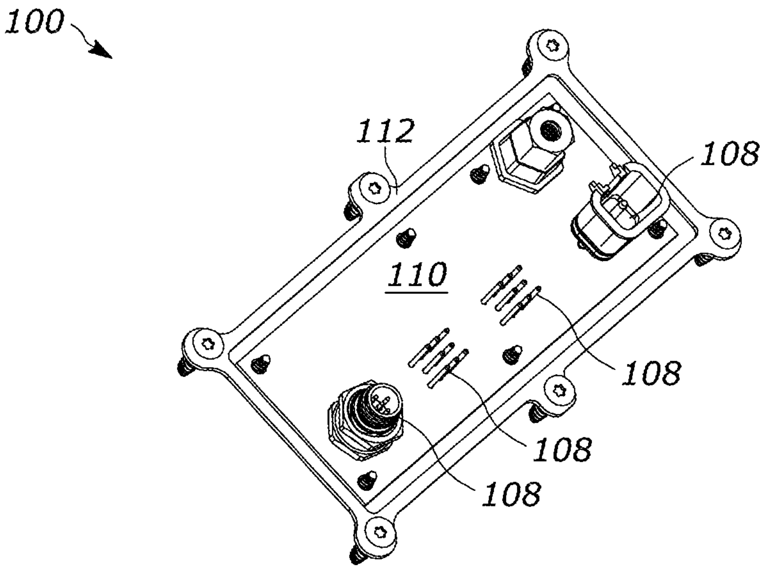
FIG. 7*a* is a front perspective view of internal components of an embodiment of the connector plate of FIG. 6*a* in accordance with the present disclosure.
Figure 7B:
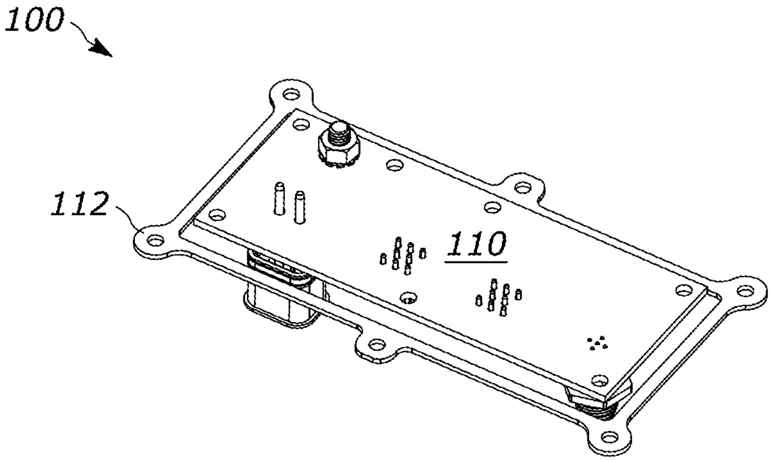
FIG. 7*b* is a rear perspective view of the internal components of FIG. 7*a*.

FIGS. 7*a* and 7*b* depict two views of the internal components of the distribution module 100 without the external components visible.

FIGS. 8*a* and 8*b* depict the printed circuit board 110. The printed circuit board 110 communicates between other stabilizing components on the watercraft to provide sufficient power and control to counteract any unwanted rotational forces acting upon the watercraft. The printed circuit board 110 may be a printed circuit board or other similar printed circuit board system as would be understood by those of ordinary skill in the art. The printed circuit board 110 may be capable of interfacing with connectors from various electronic components, such as a software control module, an engine control module, a navigation system, a gyroscopic stabilizer, a water engagement device, an engine, and other similar components that could provide the intended functionality. The printed circuit board 110 may be preprogrammed to be off-the-shelf ready to be used.

FIG. 9 depicts a sealing gasket 112. The gasket 112 ensures no water is able to penetrate into the internal components of the distribution module 100 when in use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Although the present disclosure and its advantages have been described in detail, it should be understood that various changes, substitutions and alterations can be made herein without departing from the spirit and scope of the disclosure as defined in the appended claims. Having thus described in detail preferred embodiments of the present disclosure, it is to be understood that the disclosure defined by the above paragraphs is not to be limited to particular details set forth in the above description as many apparent variations thereof are possible without departing from the spirit or scope of the present disclosure.

The invention claimed is:

1. A distribution module assembly configured for mounting to a marine vessel, the distribution module assembly comprising:

a mounting bracket including a mounting base plate disposed between a first end portion and a second end portion, wherein the first and second end portions are offset from and parallel to the mounting base plate, wherein each of the first and second end portions includes a standoff, and wherein the mounting bracket is configured to be connected to a surface of the marine vessel;

a housing including a centrally disposed compartment defined by a plurality of perimeter compartment walls with an open top, a pair of pockets each defined by a plurality of pocket walls extending from oppositely disposed compartment walls, and a volume defined by the plurality of perimeter compartment walls, the volume extending between the pair of pockets and a rear edge of the housing;

wherein the housing is connected to the mounting bracket such that the first and second end portions are each disposed in one of the pair of pockets and the mounting base plate is disposed in the volume; and a printed circuit board disposed within the housing.

2. The assembly of claim 1, wherein the printed circuit board is further configured to interface with various electronic components on the marine vessel such as a software control module, an engine control module, a navigation system, a gyroscopic stabilizer, a water engagement device, an engine, and other similar components that could provide the intended functionality and stability during operation of a marine vessel.

3. A distribution module assembly configured for mounting to a marine vessel, the distribution module assembly comprising:

a mounting bracket including a mounting base plate disposed between a first end portion and a second end portion, wherein the first and second end portions are offset from and parallel to the mounting base plate, wherein each of the first and second end portions includes a standoff, and wherein the mounting bracket is configured to be connected to a surface of the marine vessel;

a housing including a centrally disposed compartment defined by a plurality of perimeter compartment walls with an open top, a pair of pockets each defined by a plurality of pocket walls extending from oppositely disposed compartment walls, and a volume defined by the plurality of perimeter compartment walls, the volume extending between the pair of pockets and a rear edge of the housing;

wherein the housing is connected to the mounting bracket such that the first and second end portions are each disposed in one of the pair of pockets and the mounting base plate is disposed in the volume; and a sealing gasket disposed within the housing.

4. A distribution module assembly configured for mounting to a marine vessel, the distribution module assembly comprising:

a mounting bracket including a mounting base plate disposed between a first end portion and a second end portion, wherein the first and second end portions are offset from and parallel to the mounting base plate, wherein each of the first and second end portions includes a standoff, and wherein the mounting bracket is configured to be connected to a surface of the marine vessel; and a housing including a centrally disposed compartment defined by a plurality of perimeter compartment walls with an open top, a pair of pockets each defined by a plurality of pocket walls extending from oppositely disposed compartment walls, and a volume defined by the plurality of perimeter compartment walls, the volume extending between the pair of pockets and a rear edge of the housing;

wherein the housing is connected to the mounting bracket such that the first and second end portions are each disposed in one of the pair of pockets and the mounting base plate is disposed in the volume, wherein an interior of the distribution model is filled with a solid or gelatinous compound in order to ensure that the internal components of the distribution module are not damaged or compromised by water or other contaminants.

5. A method of installing a distribution module to a transom of a marine vessel, the method comprising the steps of:

connecting a mounting bracket to a surface of a marine vessel, wherein the mounting bracket includes a mounting base plate disposed between a first end portion and a second end portion, wherein the first and second end portions are offset from and parallel to the mounting base plate, wherein each of the first and second end portions includes a standoff;

connecting a housing to the mounting bracket, wherein the housing includes a compartment defined by a plurality of perimeter compartment walls with an open top and a pair of pockets each defined by a plurality of pocket walls extending from oppositely disposed compartment walls, and a volume defined by the plurality of perimeter compartment walls, the volume extending between the pair of pockets and a rear edge of the housing, and wherein the first and second end portions are each disposed in one of the pair of pockets and the mounting base plate is disposed in the volume; and a printed circuit board disposed within the housing.

6. The method of claim 5, wherein the printed circuit board is further configured to interface with various electronic components on the marine vessel such as a software control module, an engine control module, a navigation system, a gyroscopic stabilizer, a water engagement device, an engine, and other similar components that could provide the intended functionality and stability during operation of a marine vessel.

7. A method of installing a distribution module to a transom of a marine vessel, the method comprising the steps of:

connecting a mounting bracket to a surface of a marine vessel, wherein the mounting bracket includes a mounting base plate disposed between a first end portion and a second end portion, wherein the first and second end portions are offset from and parallel to the mounting base plate, wherein each of the first and second end portions includes a standoff;

connecting a housing to the mounting bracket, wherein the housing includes a compartment defined by a plurality of perimeter compartment walls with an open top and a pair of pockets each defined by a plurality of pocket walls extending from oppositely disposed compartment walls, and a volume defined by the plurality of perimeter compartment walls, the volume extending between the pair of pockets and a rear edge of the housing, and wherein the first and second end portions are each disposed in one of the pair of pockets and the mounting base plate is disposed in the volume; and a sealing gasket disposed within the housing.

8. A marine vessel, comprising:

a distribution module assembly connected to a surface of a marine vessel, the distribution module assembly further comprising:

a mounting bracket including a mounting base plate disposed between a first end portion and a second end portion, wherein the first and second end portions are offset and parallel to the mounting base plate, wherein each of the first and second end portions includes a standoff, and wherein the mounting bracket is configured to be connected to a surface of the marine vessel;

a housing including a centrally disposed compartment defined by a plurality of perimeter compartment walls with an open top, a pair of pockets each defined by a plurality of pocket walls extending from oppositely disposed compartment walls, and a volume defined by the plurality of perimeter compartment walls, the volume extending between the pair of pockets and a rear edge of the housing, wherein the housing is connected to the mounting bracket such that the first and second end portions are each disposed in one of the pair of pockets and the mounting base plate is disposed in the volume; and a printed circuit board disposed within the housing.

9. The marine vessel of claim 8, wherein the printed circuit board is further configured to interface with various electronic components on the marine vessel such as a software control module, an engine control module, a navigation system, a gyroscopic stabilizer, a water engagement device, an engine, and other similar components that could provide the intended functionality and stability during operation of a marine vessel.

10. A marine vessel, comprising:

a distribution module assembly connected to a surface of a marine vessel, the distribution module assembly further comprising:

a mounting bracket including a mounting base plate disposed between a first end portion and a second end portion, wherein the first and second end portions are offset and parallel to the mounting base plate, wherein each of the first and second end portions includes a standoff, and wherein the mounting bracket is configured to be connected to a surface of the marine vessel;

a housing including a centrally disposed compartment defined by a plurality of perimeter compartment walls with an open top, a pair of pockets each defined by a plurality of pocket walls extending from oppositely disposed compartment walls, and a volume defined by the plurality of perimeter compartment walls, the volume extending between the pair of pockets and a rear edge of the housing, wherein the housing is connected to the mounting bracket such that the first and second end portions are each disposed in one of the pair of pockets and the mounting base plate is disposed in the volume; and a sealing gasket disposed within the housing.

11. A marine vessel, comprising:

a distribution module assembly connected to a surface of a marine vessel, the distribution module assembly further comprising:

a mounting bracket including a mounting base plate disposed between a first end portion and a second end portion, wherein the first and second end portions are offset and parallel to the mounting base plate, wherein each of the first and second end portions includes a standoff, and wherein the mounting bracket is configured to be connected to a surface of the marine vessel;

a housing including a centrally disposed compartment defined by a plurality of perimeter compartment walls with an open top, a pair of pockets each defined by a plurality of pocket walls extending from oppositely disposed compartment walls, and a volume defined by the plurality of perimeter compartment walls, the volume extending between the pair of pockets and a rear edge of the housing, wherein the housing is connected to the mounting bracket such that the first and second end portions are each disposed in one of the pair of pockets and the mounting base plate is disposed in the volume, wherein an interior of the distribution model is filled with a solid or gelatinous compound in order to ensure that the internal components of the distribution module are not damaged or compromised by water or other contaminants.

* * * * *